May 9, 1950 R. M. MAGNUSON ET AL 2,506,802
CORING MACHINE
Filed Aug. 1, 1947 2 Sheets-Sheet 2

INVENTORS
ROY M. MAGNUSON
TRAVER J. SMITH
RALPH K. DAUGHERTY
BY Harper Allen
ATTORNEY Patented May 9, 1950

2,506,802

UNITED STATES PATENT OFFICE 2,506,802

CORING MACHINE

Roy M. Magnuson, Campbell, and Traver J. Smith and Ralph K. Daugherty, San Jose, Calif.; said Smith and said Daugherty assignors to said Magnuson Application August 1, 1947, Serial No. 765,290

4 Claims. (Cl. 146—52)

The present invention relates to coring machines and is concerned more particularly with the provision of an improved machine of this character which lends itself to rapid operation of the machine in coring fruit and the like.

It is a general object of the invention to provide an improved coring machine.

Another object of the invention is to provide a coring machine having a mode of operation which removes the fear of the operator in feeding fruit so that a higher rate of feed can be obtained.

Still another object of the invention is to provide a continuously operating coring machine which times the feeding of fruit and thereby removes operator control of the capacity of the machine.

A further object of the invention is to provide a coring machine in which the coring parts are all in idle position while travelling through a feeding zone so that there is no interference with free and quick placing of the fruit in operative relation to such parts.

Another object of the invention is to provide a coring device in which the relative movement between the fruit and the coring knife in coring is effected by causing the fruit support with the fruit thereon to recede over the knife during the coring operation.

Other objects and advantages of the invention will be apparent from the following description of a preferred embodiment thereof, as illustrated in the accompanying drawings, in which.

In prior coring machines it has generally been necessary for the operator to feed fruit to the machine either while the coring parts are in motion or while certain fruit centering devices or fruit holding devices are moved in to clasp the fruit. The operator in working with such machines had to be careful to avoid injury from carelessness. In any event, with these characteristics the caution or fear of injury on the part of the operator has caused a slower operation of the machine and a reduced output in terms of the number of pieces of fruit cored per unit of time. Also, in such machines, particularly those of a start and stop nature, the operator controlled the cycling of the machine and consequently the potential rate of output resulting in the possibility of operator's slowing down in production.

In accordance with the instant invention the coring machine provides for feeding of the fruit to a coring station while the station is travelling through a feeding zone in which all of the coring parts per se are idle. As a result the operator can place a piece of fruit in the coring station without fear of injury and let his hand travel with the station in depositing the fruit thereon. Also, because of the constant speed of operation of the machine at a selected rate the cycling of the machine and its capacity output is controlled by such selected speed rather than by the operator.

Figure 1:
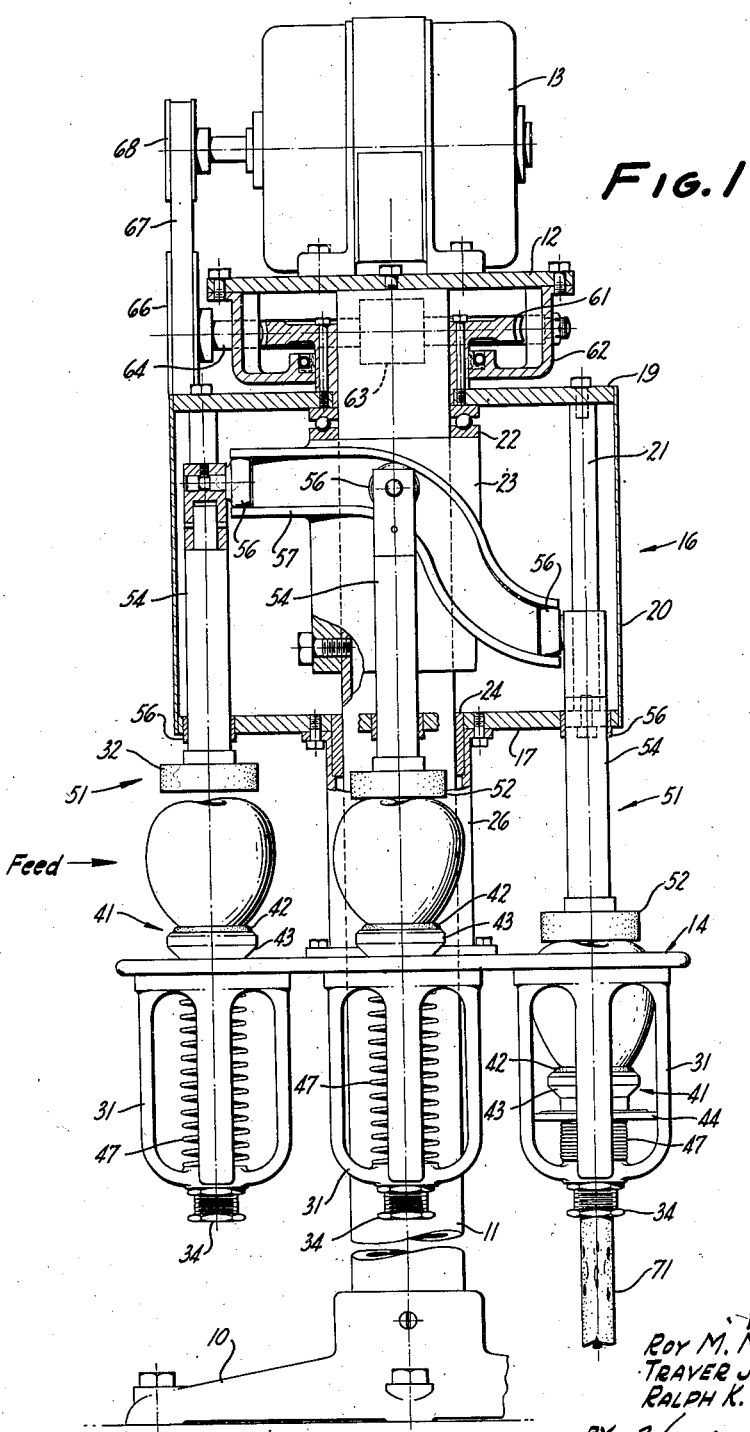
Figure 1 is a side elevational view of the coring machine embodying the invention, with certain parts broken away and others shown in section to illustrate the construction and mode of operation of the device.

Referring to Figure 1, there is shown a coring machine embodying the invention including a base 10 from which a center post or standard 11 projects upwardly through the machine to a top motor support plate 12 for the drive motor 13. Journalled about the post 11 is a lower table 14 and an upper frame or turret 16 comprising a lower plate 17 and an upper plate 19 secured together by spaced posts 21. A cover 20 extends between the plates 17 and 19 to enclose the turret 16. The upper plate 19 is carried by a bearing 22 on a cam hub 23 secured on the standard 11, while the lower plate 17 is journalled about the post 11 by a sleeve bearing 24. The lower plate 17 is connected by a flange sleeve 26 with the table 14. In turn the table 14 is journalled by a sleeve bearing 27 (Figure 2) about the post 11. In the present instance the drive for the turret and table mechanism may take the form of a worm gear 61 secured on the upper plate 19 within a housing 62 carried by the motor bracket 12, and a worm 63 cooperating with the worm wheel and driven through a shaft 64, a sheave 66 and a belt 67 from the motor sheave 68. The motor 13 may be of the variable speed drive type if preferred so that the machine may operate at selected speeds.

As will now be described, the machine is provided with a series of equally spaced apart coring stations, each of which is cycled successively through the coring operation. The lower table 14 carries an equally spaced series of fruit supports of similar construction, one at each coring station. Each coring station is provided with a cage-like housing 31 secured by suitable screws 32 to the lower face of the table 14 and depending therefrom. Each housing 31 has a lower boss 33 which is internally threaded to receive a mounting and support member or nut 34 of the coring knife assembly. Each knife assembly includes a tubular knife support 36 press fitted in the nut 34 and carrying a tubular knife portion 37 having a smaller internal diameter than its support tube 36 with the knife edge flaring inwardly from the outer diameter downwardly to the inner diameter of the knife portion. This construction enhances passage of fruit cores through the knife assembly. A clamping nut 38 maintains the vertically adjusted position of the knife 37 with respect to the table 14.

Figure 2:
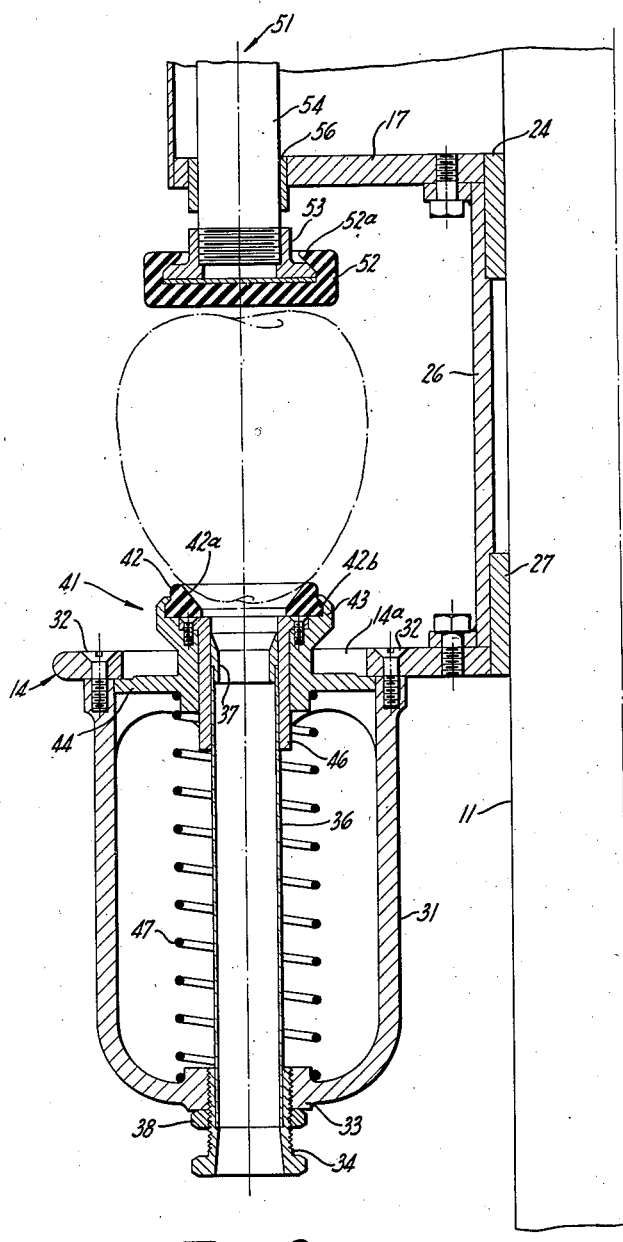
Figure 2 is an enlarged sectional view of one of the coring stations and the operative parts thereof showing their relation at the time of feeding of a piece of fruit to the station.

A sliding fruit support 41 is provided at each coring station in the form of a resilient ring 42 seated in a support and guide sleeve 43 which is provided with an annular flange 44 slidably engaging within the housing 31. The support and guide sleeve 43 is secured by suitable screws to an inner flanged sleeve 46 which is guided on the tube 36. A compression spring 47 extends between the lower end of the housing 31 and the lower face of the flange 44 so that the support and guide sleeve 43 is normally in its raised position, as shown in Figure 2, with its flange 44 engaging the lower face of the table 14 around the cooperating aperture 14a therein. It will be seen that the knife 37 is concealed in this upper position of the fruit support and that the fruit may be freely placed upon its resilient support ring 42.

The resilient fruit support ring 42 may be formed of suitable material such as synthetic rubber to provide an inner upwardly facing substantially frusto-conical surface 42a which provides a fruit centering function, and an outer annular rib 42b which snaps into a complementary recess in the sleeve 43 to retain the centering ring 42 in place.

Associated with each of the coring stations 41 there is provided a pusher 51 comprising a resilient pad 52 having a planar lower surface and a recessed upper surface to provide a lip 52a engaging over a retaining collar 53. The collar 53 is threaded on the lower end of a pusher rod 54. The rod 54 is guided in a bearing 56 in the lower plate 17 and at its upper end carries a roller 56 engaging in a cam track 57 on the cam hub 23.

Figure 3:
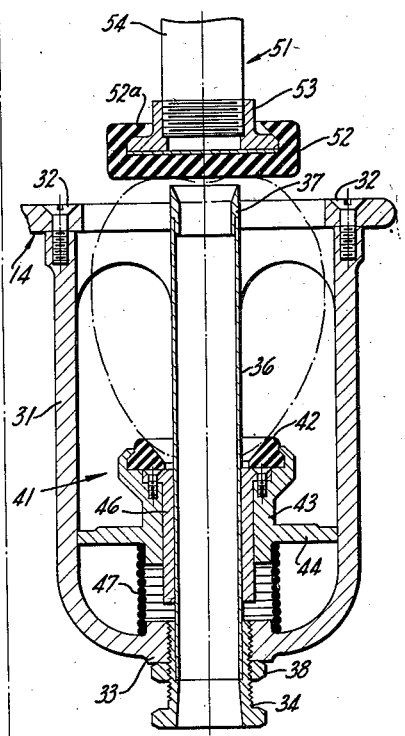
Figure 3 is a fragmentary view similar to Figure 2 but showing the relative position of the parts at the end of the coring stroke.

In the cycling of the machine, a desired selected amount of each cycle or rotation of operation of a coring station is provided as a feeding zone and in which all of the coring parts are idle. In the present instance the cam 57 is symmetrical so that a 180° idle feeding zone is provided during which the operator can place fruit such as apples in the various stations as they travel through the feeding zone. After a coring station with an apple therein has travelled past the feeding zone, the cam 57 becomes effective to move the pusher 51 downwardly so that its resilient pad engages the top of the apple on the fruit support, and by driving the apple, causes the fruit support 41 to recede from the position shown in Figure 2 to that shown in Figure 3. Thus the fruit is caused to telescope downwardly over the coring knife 37 in carrying out the coring operation. This operation occurs as a coring station is travelling from left to right as viewed in Figure 1. Subsequently, as the pusher is retracted by the cam 57, the fruit is raised from the coring knife by a spring 47 and can be either removed manually from the fruit support or can be swept off by a suitable conventional shunt when the fruit support or coring station again starts its travel through the idle feeding zone. The fruit cores are pushed down through the coring knife for discharge as indicated at 71 in Figure 1.

It will be noted that the entire operation is carried out during constant rotation of the machine and that, for example, with a four-station machine as illustrated and a R. P. M. of the table and turret mechanism of 15 as provided, the machine can effect coring of sixty units of fruit per minute. It will also be noted that with the operator placing fruit in the coring stations at a location as indicated by the "feed" arrow in Figure 1, there are no parts in operation which could cause injury to the operator. As a result, the operator's entire attention can be directed toward the feeding of the fruit with the resulting faster processing of the fruit.

While we have shown and described certain preferred embodiments of the invention, it will be seen that the invention is capable of variation and modification from the form shown so that its scope should be limited only by the scope of the claims appended hereto.

We claim:

1. In a coring machine, a table rotatable about an upright axis, means for effecting a constant speed drive of said table, a series of depressible fruit supports carried by said table and normally spring-urged to an upper position, a coring device mounted within each of said supports and disposed in concealed relation with said support in its upper position and in exposed position upon receding of said support to its depressed position, the mounting means for said coring device supporting said coring device below the level of the table and being provided with a bottom opening for ejection of cores therethrough, an upper frame connected for rotation with the table, a series of fruit pushers carried by said frame in alignment respectively with said fruit supports, and cam means for controlling reciprocation of said pushers.

2. In a coring machine, a table rotatable about an upright axis, means for effecting a constant speed drive of said table, a depressible fruit support carried by said table and normally spring-urged to an upper position, a tubular coring knife mounted within said support in a normally concealed position, the mounting means for said knife having a bottom opening for ejection of cores therethrough, an upper frame connected for rotation with the table, a fruit pusher carried by said frame in alignment with said fruit support, and cam means for controlling reciprocation of said pusher.

3. In a coring machine, a hollow fruit support having an upper resilient face, a tubular coring knife disposed within said fruit support, mounting means for said coring knife having a bottom opening coinciding with the opening through said coring knife for ejection of pits therethrough, means urging said fruit support upwardly to a position in which said knife is concealed for feeding of fruit onto said upper face, and a pusher device in opposed relation to said fruit support for engaging the fruit thereon and for pushing against the fruit to cause receding of the fruit support and engagement of the fruit with the coring knife.

4. In a coring machine, a rotary table, means for driving said table, a series of fruit coring stations on said table, each station including a depending frame having a tubular coring knife mounted in the bottom portion thereof and extending upwardly to adjacent the upper level of the table, a fruit support mounted within each depending frame and being guided about said knife and within said frame for receding movement from an upper position in which said knife is concealed for feeding of fruit on to the upper face of said fruit support, and a pusher device in opposed relation to each fruit support for engaging the fruit thereon and pushing against the fruit to cause receding of the fruit support and engagement of the fruit over the coring knife.

ROY M. MAGNUSON.
TRAVER J. SMITH.
RALPH K. DAUGHERTY.

REFERENCES CITED

The following references are of record in the file of this patent:

UNITED STATES PATENTS

| Number | Name | Date |
|---|---|---|
| 131,126 | Smith | Sept. 3, 1872 |
| 330,839 | Knapp | Nov. 17, 1885 |
| 857,512 | Baker | June 18, 1907 |
| 1,284,132 | Nikolow | Nov. 5, 1918 |
| 1,583,100 | Reynolds | May 4, 1926 |
| 1,766,824 | Jones | June 24, 1930 |
| 2,097,170 | Wilson | Oct. 26, 1937 |
| 2,243,530 | Kok | May 27, 1941 |